(12) United States Patent
Shoaf

(10) Patent No.: US 8,742,761 B1
(45) Date of Patent: Jun. 3, 2014

(54) METALLIC SENSING GROUND PROBE

(76) Inventor: William Robert Shoaf, Medford Lakes, NJ (US)

( * ) Notice: Subject to any disclaimer, the term of this patent is extended or adjusted under 35 U.S.C. 154(b) by 133 days.

(21) Appl. No.: 13/363,961

(22) Filed: Feb. 1, 2012

(51) Int. Cl.
*G01V 3/08* (2006.01)

(52) U.S. Cl.
USPC .......................................................... 324/326

(58) Field of Classification Search
USPC .......................................................... 324/326
See application file for complete search history.

(56) References Cited

U.S. PATENT DOCUMENTS

| | | | |
|---|---|---|---|
| 3,712,121 A | 1/1973 | Fletcher et al. | |
| 3,968,428 A | 7/1976 | Numoto | |
| 5,093,622 A * | 3/1992 | Balkman | 324/326 |
| 5,150,622 A | 9/1992 | Vollweiler | |
| 5,487,432 A | 1/1996 | Thompson | |
| 5,538,090 A | 7/1996 | Siler | |
| 5,554,934 A * | 9/1996 | Ward et al. | 324/326 |
| 7,240,743 B2 | 7/2007 | Buss et al. | |
| 7,388,381 B1 | 6/2008 | Werkema, Jr. | |
| 7,788,970 B2 | 9/2010 | Hitt et al. | |
| 7,830,149 B1 * | 11/2010 | Olsson et al. | 324/326 |
| 2006/0038569 A1* | 2/2006 | Kellermann | 324/326 |
| 2006/0191319 A1 | 8/2006 | Kurup | |
| 2012/0062223 A1* | 3/2012 | Olsson et al. | 324/252 |

FOREIGN PATENT DOCUMENTS

EP 216070 A1 * 4/1987

* cited by examiner

*Primary Examiner* — Bot Ledynh
(74) *Attorney, Agent, or Firm* — Michael I. Kroll

(57) ABSTRACT

The present invention is a metallic sensing ground probe comprising a rod and a handle having a port for storing a power supply in electrical communication with a circuit, for generating an electric field between a sensor tip on a distal end of the rod and a logic circuit for actuating an LED in an LED display unit on the handle, when the sensor tip encounters a metal object within the ground thus completing the circuit.

3 Claims, 9 Drawing Sheets

METALLIC SENSING GROUND PROBE

BACKGROUND OF THE INVENTION

1. Field of the Invention

The present invention relates generally to ground probes, and more specifically to a metallic sensing ground probe that provides feedback when a metallic object is detected in the ground approximate a sensor tip on a rod.

When a standard ground probe is used to probe the ground over a suspected location for a utility pipe, a rocky soil may present a problem of whether the encountered object is a rock or the utility pipe. A hammer may be used on the standard ground probe to displace the rock or confirm location of the utility pipe, whereby this can lead to damaging the utility pipe coating or the utility pipe itself.

The present invention provides a metallic sensing ground probe containing a rod having a sensor tip located on a distal end of the rod, so that when a metal object, such as a utility pipe, is encountered a circuit will be completed that will illuminated a LED in a LED display unit located on a handle as a visual indicator to a worker that the metal object has been encountered. It is further envisioned when the standard ground probe is used and upon penetration stoppage of its rod in the ground, the rod can be withdrawn. The rod of the metallic sensing ground probe can then be inserted into the ground to determine whether the object is metal or not.

2. Description of the Prior Art

There are metal detectors providing feedback when encountering metal objects buried in the ground. While these metal detectors may be suitable for the purposes for which they where designed, they would not be as suitable for the purposes of the present invention as heretofore described.

It is thus desirable to provide a metallic sensing ground probe incorporating a sensor tip on a distal end of a rod to detect a metal object, such as a buried metal utility pipe when contacted by the sensor tip.

It is further desirable to provide a metallic sensing ground probe having a plurality of LEDs within an LED display unit on a handle indicating the operational status thereof and when the sensor tip has encountered the metal object within the ground.

SUMMARY OF THE PRESENT INVENTION

The present invention is a metallic sensing ground probe comprising a rod and a handle having a port for storing a power supply in electrical communication with a circuit, for generating an electric field between a sensor tip on a distal end of the rod and a logic circuit for actuating an LED in an LED display unit on the handle, when the sensor tip encounters a metal object within the ground thus completing the circuit.

A primary object of the present invention is to provide a metallic sensing ground probe actuating an LED in an LED display unit, when a sensor tip on a distal end of a rod encounters and underground metal object.

Another object of the present invention is to provide a metallic sensing ground probe in which the sensor tip will actuate and LED in the LED display unit when in a predetermined proximity on the metal object.

Yet another object of the present invention is to provide a metallic sensing ground probe having a handle connected to the rod, wherein the handle incorporates a port for storing a power supply therein.

Still yet another object of the present invention is to provide a metallic sensing ground probe wherein the power supply is a rechargeable battery.

An additional object of the present invention is to provide a metallic sensing ground probe with a logic circuit within the handle in electrical communication with the power supply.

A further object of the present invention is to provide a metallic sensing ground probe having a plurality of LEDs in the LED display unit on the handle in electrical communication with the logic circuit.

A yet further object of the present invention is to provide a metallic sensing ground probe in which the logic circuit is a microprocessor.

A still yet further object of the present invention is to provide a metallic sensing ground probe in which the rod is fixedly attached to the handle and having a through bore with electrical wiring passing therethrough.

Another object of the present invention is to provide a metallic sensing ground probe having the sensor tip generating an electrical current when encountering the metal object, thereby completing a circuit that will actuate an LED in the LED display unit.

Additional objects of the present invention will appear as the description proceeds.

The present invention overcomes the shortcomings of the prior art by providing a metallic sensing ground probe, in which a sensor tip on a distal end of a rod can be inserted into the ground to actuate and LED in an LED display unit on a handle when encountering a metal object.

The foregoing and other objects and advantages will appear from the description to follow. In the description reference is made to the accompanying drawing figures, which form a part hereof, and in which is shown by way of illustration specific embodiments by which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings in which.

DESCRIPTION OF THE REFERENCED NUMERALS

Figure 1:
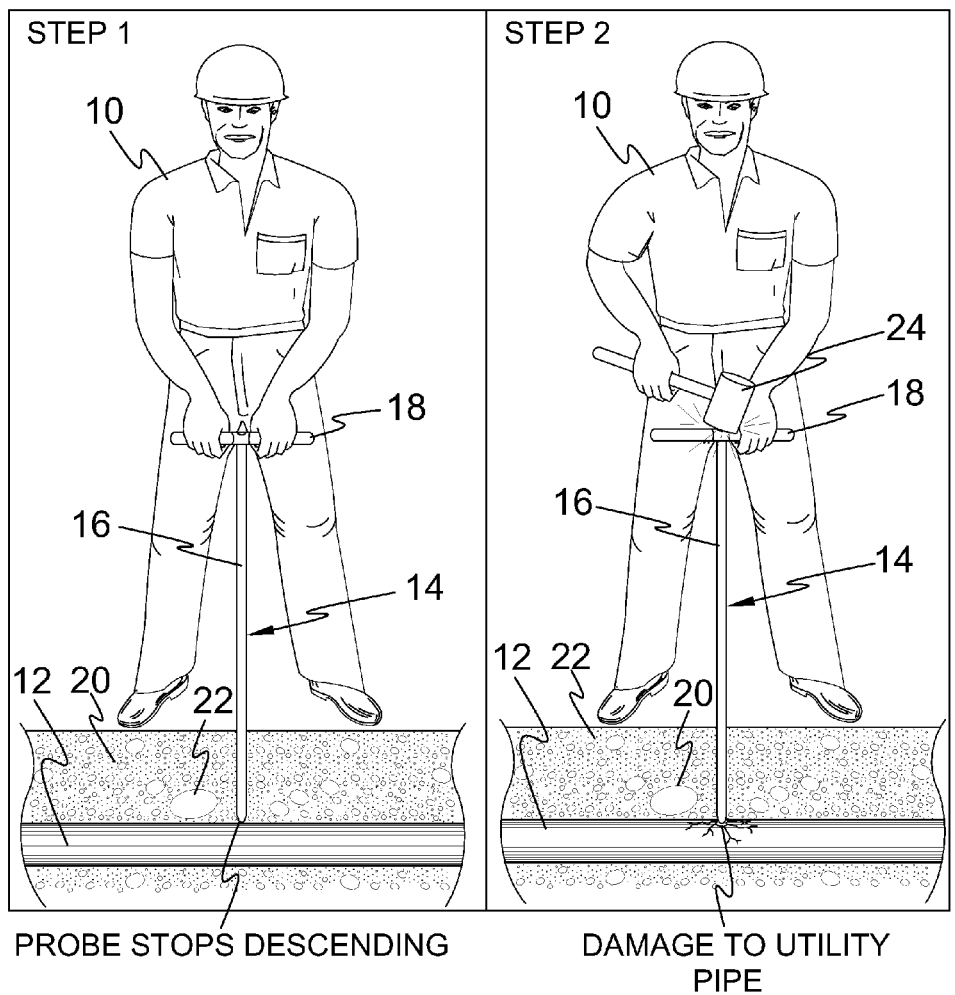
FIG. 1 is an illustrative view of the prior art in use.

Turning now descriptively to the drawings, in which similar reference characters denote similar elements throughout the several views, the Figures illustrate the metallic sensing ground probe of the present invention. With regard to the reference numerals used, the following numbering is used throughout the various drawing figures.

10 worker
12 metal utility pipe
14 standard ground probe (prior art)
16 rod of probe 14
18 handle of probe 14
20 ground
22 rock in ground 20
24 hammer
26 metallic sensing ground probe (invention)
28 rod of probe 26
30 handle of probe 26
32 sensor tip on distal end 34
34 distal end of rod 28
36 LED display unit on handle 30
38 T-shaped handgrip for handle 30
40 internal wiring in rod 28
42 switch on LED display unit 36
44 first LED on LED display unit 36
46 second LED on LED display unit 36
48 port in T-shaped handgrip 38
50 power supply in port 48
52 rechargeable battery for power supply 50
54 logic circuit in T-shaped handgrip 38
56 microprocessor for logic circuit 54

DETAILED DESCRIPTION OF THE PREFERRED EMBODIMENT

The following discussion describes in detail one or more embodiments of the invention. This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the prior art in use. Currently, when a worker 10 wants to locate a buried metal utility pipe 12, a standard ground probe 14 is used containing a rod 16 connected to a handle 18. The rod 16 is inserted down into the ground 20 and upon encountering the metal utility pipe 12, the rod 16 stops descending. However, when the ground 20 is rocky, it is often difficult to determine if the rod 16 is hitting a rock 22 or the metal utility pipe 12. When this happens, it is common for the worker 10 to hit the handle 18 with a hammer 24 to see if the rod 16 will drive through or displace the rock 22 and continue downward. When the rod 16 hits the pipe 22 the coating on the pipe 22 may get damaged.

Figure 2:
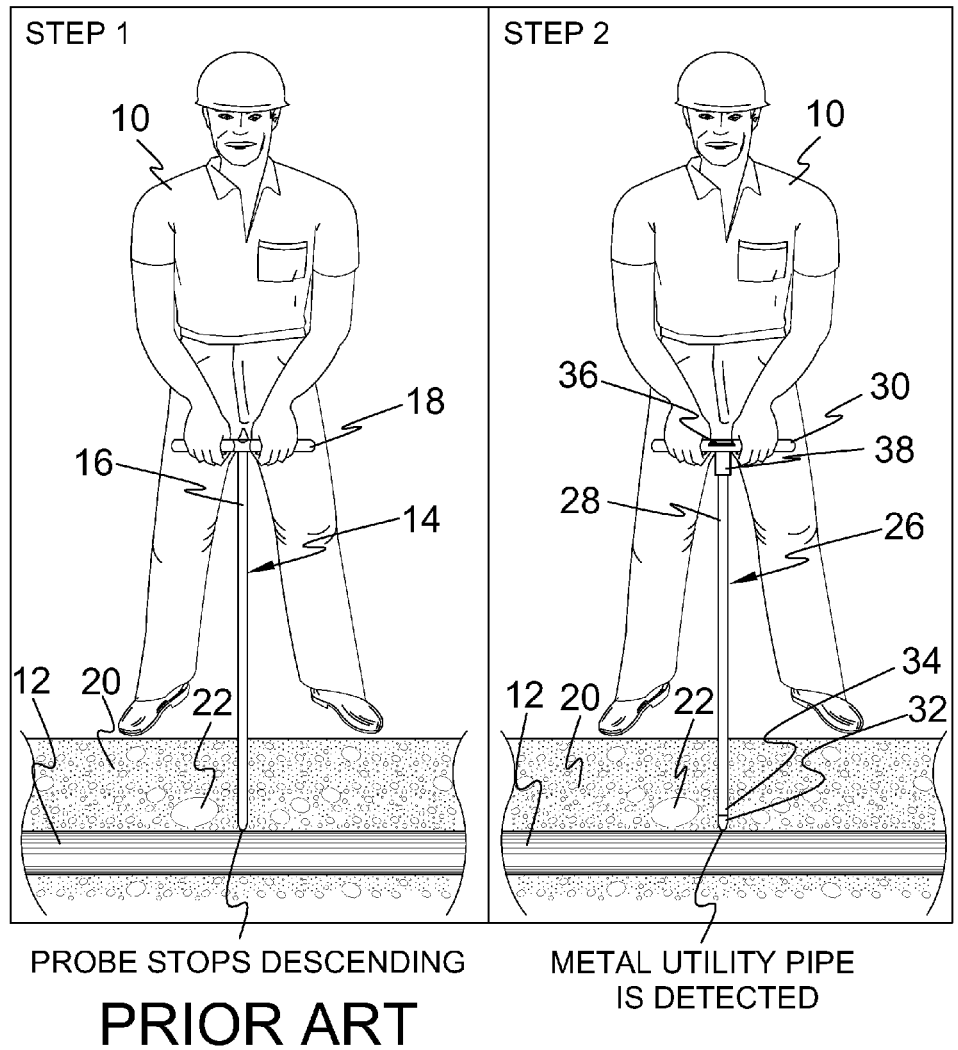
FIG. 2 is an illustrative view of the prior art and the present invention in use together.

Referring to FIG. 2, shown is an illustrative view of the prior art and the present invention in use together. The present invention is a metallic sensing ground probe 26 having a rod 28 and a handle 30. A sensor tip 32 on a distal end 34 of the rod 28 will detect the presence of a metallic object, such as a metal utility pipe 12. The probe 28 is internally wired to an LED display unit 36 located on the handle 30. When the worker 10 probes with the standard ground probe 14 and the rod 16 stops descending due to an obstruction, the worker 10 will remove the rod 16 and insert the rod 28 of the metallic sensing ground probe 26 into the ground 20 to determine the object's identity, such as the metal utility pipe 12.

Figure 3:
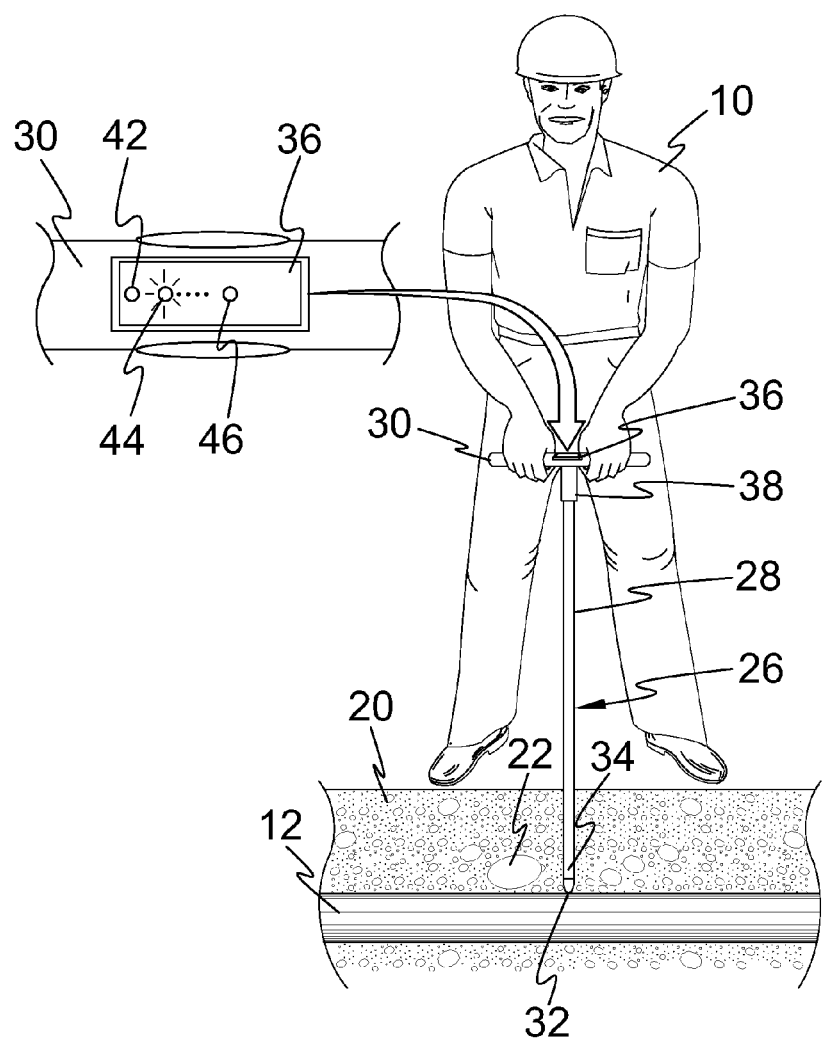
FIG. 3 is an illustrative view of the present invention in use.

Referring to FIG. 3, shown is an illustrative view of the present invention in use. The rod 28 of the metallic sensing ground probe 26 is inserted into the ground 20, to determine an obstructive objects identity. If the object is the metal utility pipe 12, then sensor tip 32 will indicate to the LED display unit 36 that the object is the metal utility pipe 12.

Figure 4:
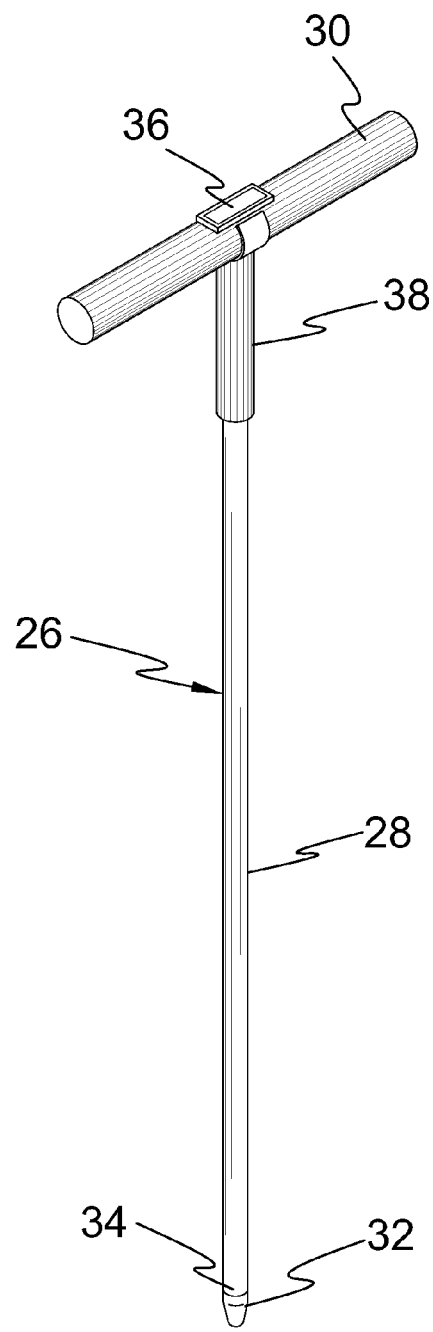
FIG. 4 is a perspective view of the present invention.

Referring to FIG. 4, shown is a perspective view of the present invention. In the metallic sensing ground probe 26, the sensor tip 32 on the distal end 34 of the rod 28 detects the presence of the metallic object, such as the metal utility pipe 12. The sensor tip 32 is internally wired to the LED display unit 36 located on the handle 18, which is a T-shaped handgrip 38.

Figure 5:
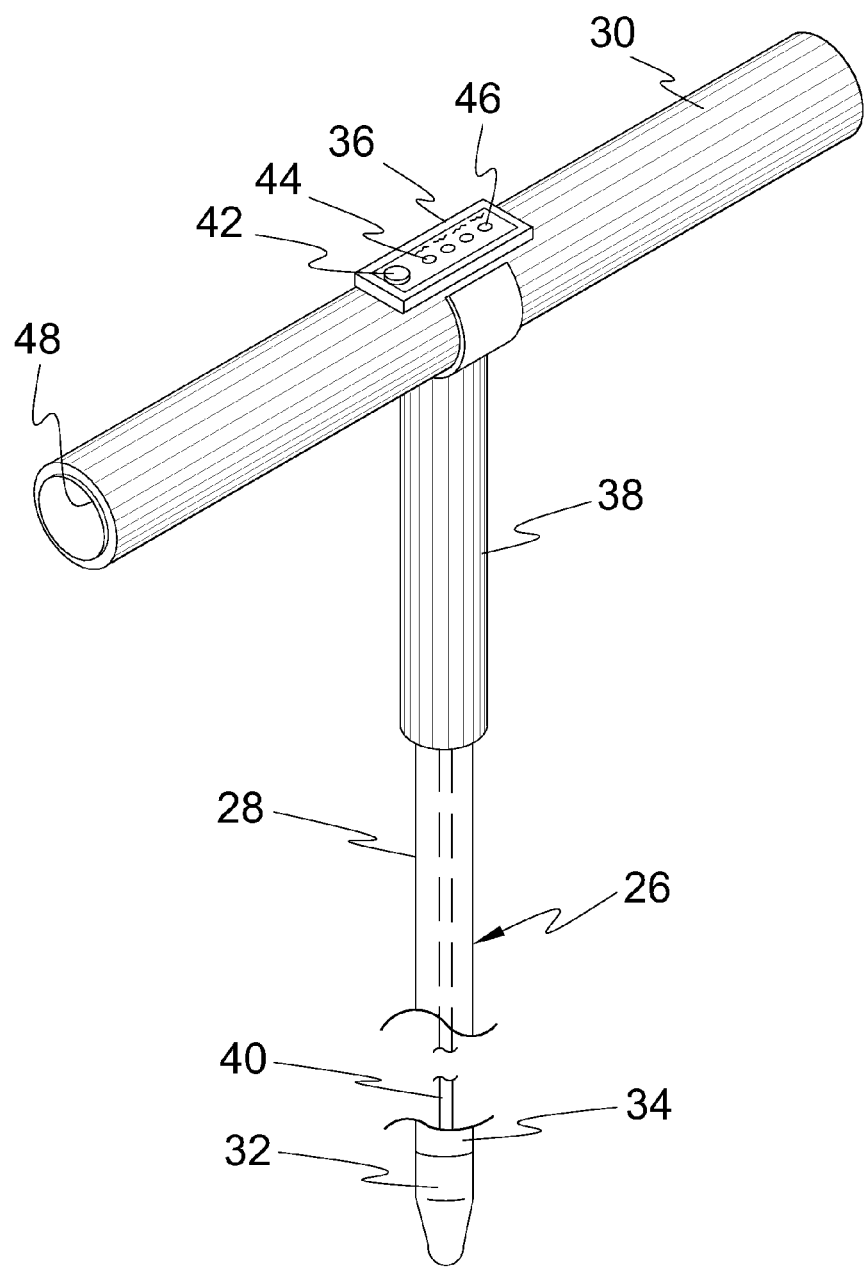
FIG. 5 is an enlarged perspective view, with parts broken away, of the present invention.

Referring to FIG. 5, shown is an enlarged perspective view, with parts broken away, of the present invention. The metallic sensing ground probe 26 comprises the rod 28 having the tip 32 on the distal end 34 to detect the presence of the metallic object, such as the metal utility pipe 12. The sensor tip 32 is internally wired through the rod 28 to the LED display unit located on the T-shaped handgrip 38 of the handle 30.

Figure 6:
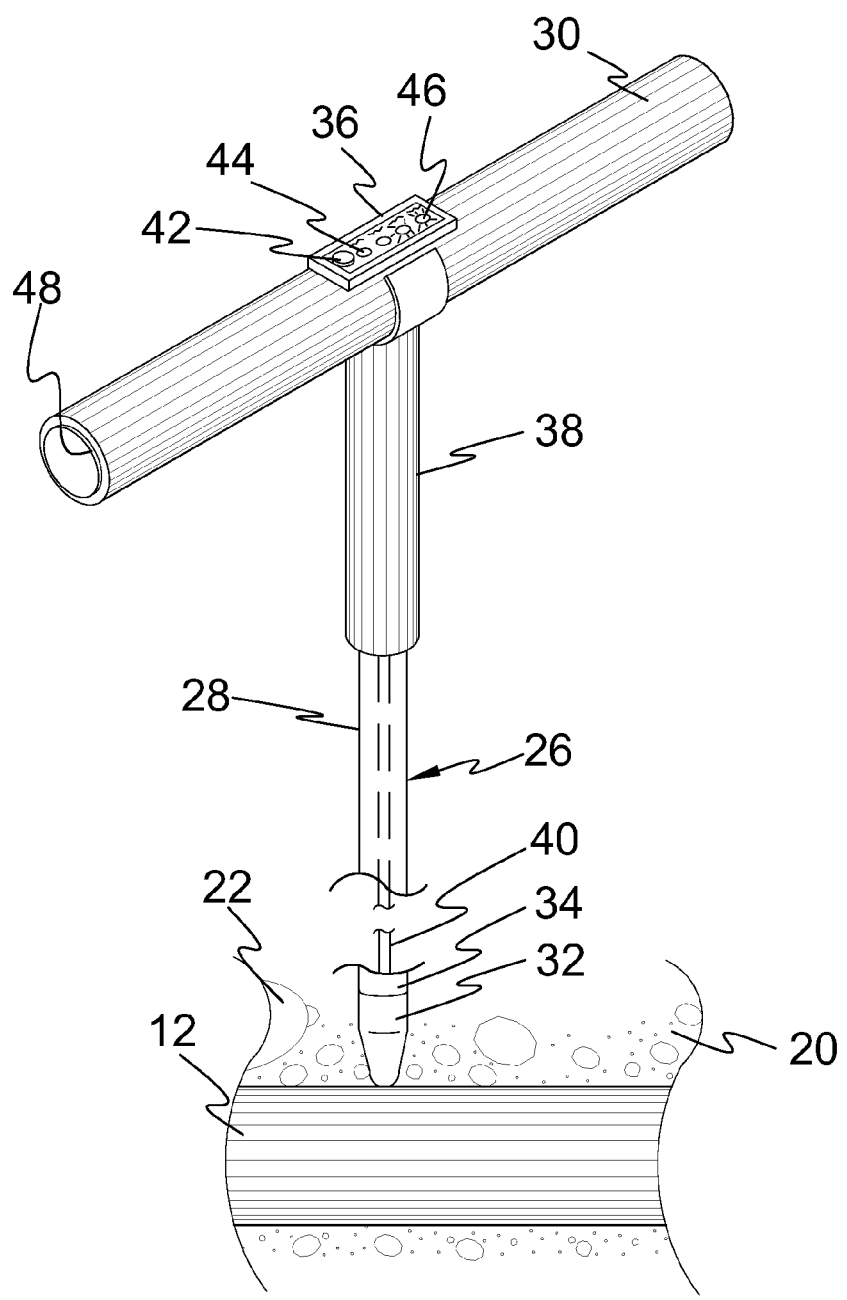
FIG. 6 is an enlarged illustrative view, with parts broken away, of the present invention contacting a metal utility pipe within the ground.

Referring to FIG. 6, shown is an enlarged illustrative view, with parts broken away, of the present invention contacting a metal utility pipe within the ground. The rod 28 with the sensor tip 32 is inserted into the ground 20, to determine the objects identity. A switch 42 on the LED display unit 36 is turned on to acknowledge that the unit is operational, whereby a first LED 42 will be illuminated. A second LED 44 will then identify the object as a metallic obstruction when illuminated.

Figure 7:
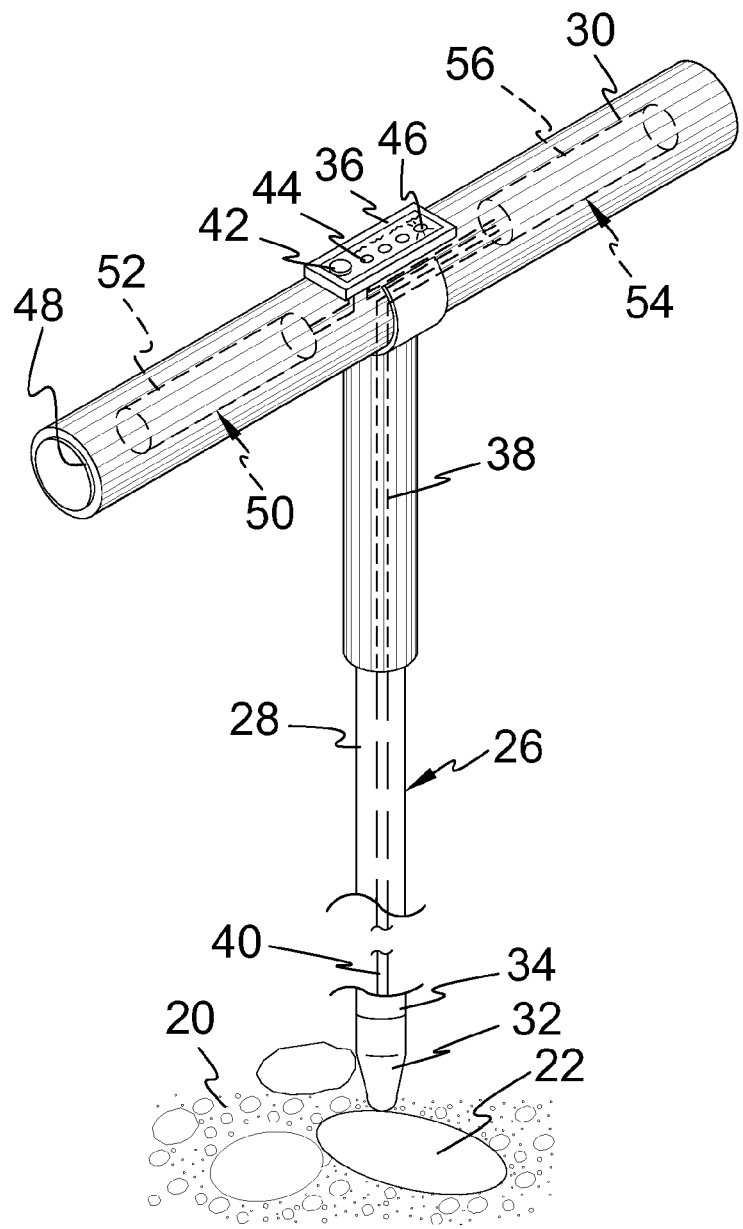
FIG. 7 is an enlarged illustrative view, with parts broken away, of the present invention contacting a rock within the ground.

Referring to FIG. 7, shown is an enlarged illustrative view, with parts broken away, of the present invention contacting a rock within the ground. The rod 28 with the sensor tip 32 is inserted into the ground 20, to determine the objects identity. The LED display unit 36 contains the switch 42 which when turned on acknowledges that the LED display unit 36 is operational through illumination of the first LED 44. When the second LED 46 is not illuminated, it indicates that the object is not metal, but the rock 22. The T-shaped handgrip 38 contains a port 48 for holding a power supply 50 therein. The power supply 50 is a rechargeable battery 52.

Figure 8:
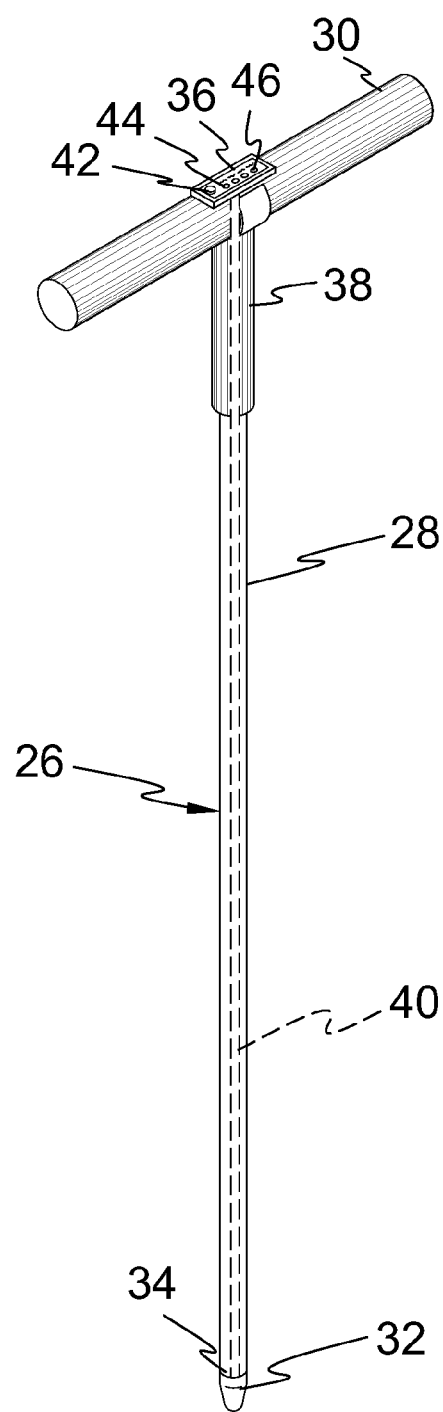
FIG. 8 is a perspective view of the present invention with the internal wiring in phantom.

Referring to FIG. 8, shown is a perspective view of the present invention with the internal wiring in phantom. The internal wiring 40 extends between the sensor tip 32 and the LED display unit 36 located on the T-shape member 38 of the handle 30. The sensing tip 32 determines the objects identity by simply illuminating the second LED as a visual indicator when metal is detected or not illuminating the second LED 46, thereby indicating that the obstruction is not metal, but the rock 22.

Figure 9:
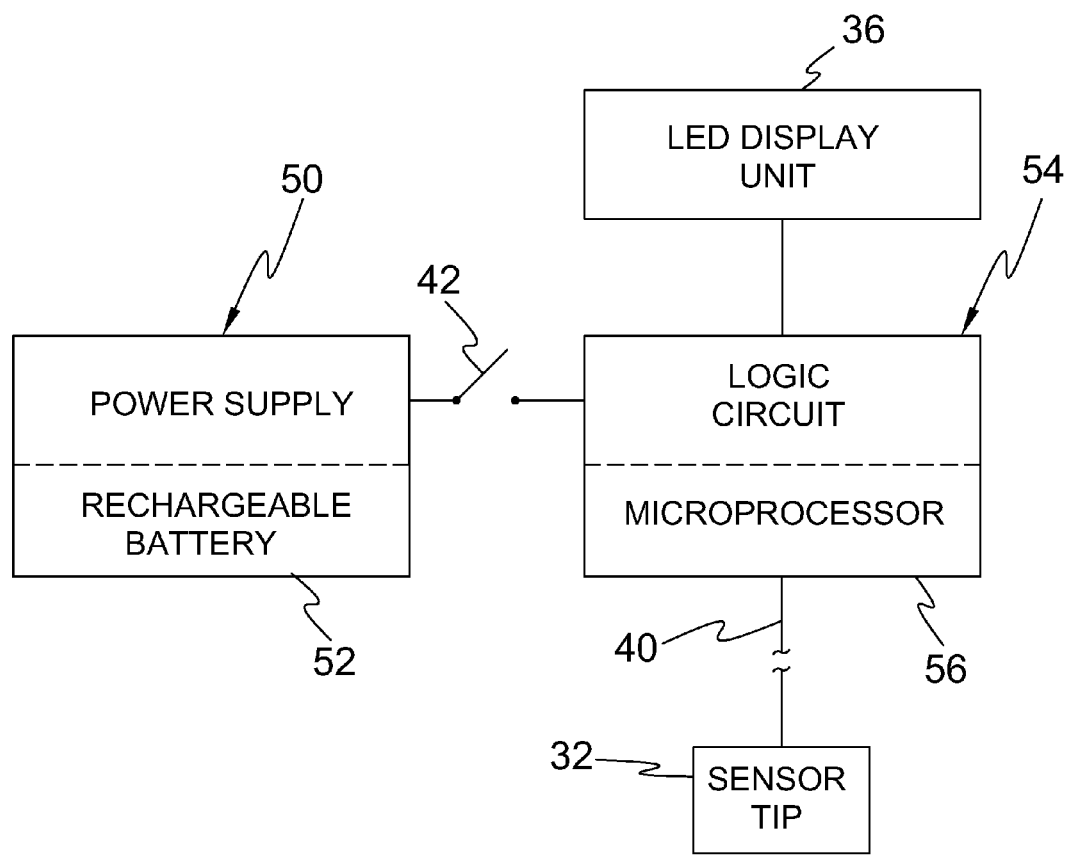
FIG. 9 is a block diagram of the electrical components of the present invention.

Referring to FIG. 9, shown is a block diagram of the electrical components of the present invention. The switch 42 is electrically connected between the power supply 50, which is the rechargeable battery 52 and a logic circuit 54, which is a microprocessor 56. The logic circuit 54/microprocessor 56 is electrically connected between the sensor tip 32 and the LED display unit 36 via the internal wiring 40.

What is claimed is:
1. The metallic sensing ground probe which comprises:
a) a rod comprised of an elongated hollow shaft which includes a proximal end and a distal end;
b) a T-shaped handle connected to the proximal end of the rod, said handle comprising a handgrip portion covering an upper portion of said rod, a straight handle portion at right angles to said handgrip portion extending out trans- versely in opposite directions from said proximal end of said rod and having an entry to port in a distal end of said straight handle portion;

c) a sensor tip connected to and forming the distal end of the rod for penetrating into the ground, whereby the sensor tip can make contact with an object located within the ground;

d) means located in the probe for detecting whether the object within the ground is a metal utility pipe;

e) said detecting means comprising an LED display unit mounted onto the T-shaped handgrip portion of the handle, a logic circuit carried within the port of the T-shaped handgrip, electrically connected to the LED display unit, a power supply carried within the port within the T-shaped handgrip electrically connected to the logic circuit, and internally wiring electrically connected to the sensor tip which extends upwardly through the elongated hollow shaft to the logic circuit, whereby when the logic circuit is activated by the power supply and the sensor tip contacts the metal utility pipe, the LED display unit will be illuminated to indicate to a worker that contact has been made with the metal utility pipe within the ground; and f) the LED display unit mounted within a housing secured by a strap-like structure on a top surface of said handle directly above said rod and comprising a switch electrically connected between a power supply and the logic circuit, and first and second LED's located adjacent opposite ends of said housing, whereby when the switch is turned on the first LED will be illuminated, to indicate to the worker that the LED display unit is activated and said second LED is illuminated when the sensor tip makes contact with the metal utility pipe.

2. The probe as recited in claim 1, wherein the logic circuit is comprised of a microprocessor.

3. The probe as recited in claim 1, wherein the power supply is comprised of a rechargeable battery.

* * * * *